J. T. WILLIS.
ACCOUNT BOOK.
APPLICATION FILED APR. 3, 1914.

1,124,090.

Patented Jan. 5, 1915.

2 SHEETS—SHEET 1.

J. T. WILLIS.
ACCOUNT BOOK.
APPLICATION FILED APR. 3, 1914.

1,124,090.

Patented Jan. 5, 1915.
2 SHEETS—SHEET 2.

Inventor
James T. Willis

Witnesses
Edwin G. McKee
C. C. Hines

By Victor J. Evans
Attorney

UNITED STATES PATENT OFFICE.

JAMES T. WILLIS, OF MACON, GEORGIA.

ACCOUNT-BOOK.

1,124,090.

Specification of Letters Patent.

Patented Jan. 5, 1915.

Application filed April 3, 1914. Serial No. 829,328.

*To all whom it may concern:*

Be it known that I, JAMES T. WILLIS, a citizen of the United States, residing at Macon, in the county of Bibb and State of Georgia, have invented new and useful Improvements in Account-Books, of which the following is a specification.

My invention relates to improvements in ledger or account books, particularly designed for the use of banks, trust companies and other financial institutions in keeping a record of the standing of the accounts from day to day, with particular regard to old and new balances, overdrafts, etc., the primary object of the invention being to provide a novel construction and relative arrangement of index sheet, account sheets and a balance card or sheet, associated with indicating tabs, whereby the operation of making the necessary entries is facilitated, time and labor in bookkeeping reduced, and a statement from day to day afforded of the standing of each account, as well as the totals of the old and new balances and old and new overdrafts, whereby the standing of the bank in these particulars from day to day may also be readily obtained.

A further object of the invention is to provide such a construction and arrangement of the elements named whereby the changes in the balances of active accounts, which vary from day to day, may be indicated, together with the old balances of the inactive accounts which are brought forward therewith, requiring only the differences between these balances to secure the current balance, as well as to provide a double or mutual indexing arrangement by which the work of singling out the respective accounts is greatly facilitated.

The invention consists of the features of construction, combination and arrangement of parts herein fully described and claimed, reference being had to the accompanying drawings in which:—

Figure 3:
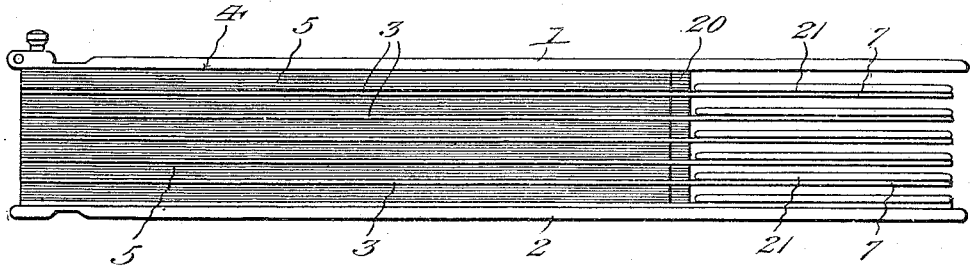
Figure 4:
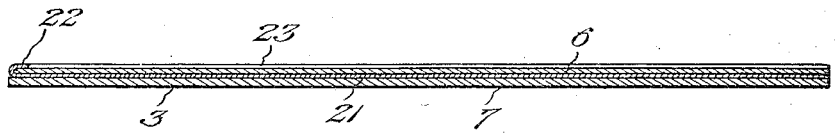
Figure 5:
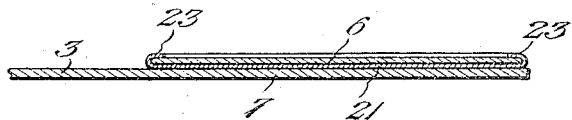

Figure 1 is a perspective view of part of an account book embodying my invention, showing the same open at a point to expose the index sheet. Fig. 2 is a plan view showing the index sheet turned back and the first ledger account sheet exposed. Fig. 3 is a plan view of portions of the associated parts on an enlarged scale. Figs. 4 and 5 are longitudinal and transverse sections through the division leaf and balance sheet holder.

In the present instance I have shown the adaptation of my invention to a sectional or divisional ledger, comprising a binder, preferably of the loose leaf type, formed of front and back covers 1 and 2 and leaves 3, the leaves 3 being arranged to divide or separate the book into sections, each including a desired number of account sheets or leaves, which may be arranged throughout the book in alphabetical divisions.

In accordance with my invention, I provide for use in connection with each section of the book an index sheet and a balance card or sheet, arranged for use in conjunction with the account sheets of the particular section, although, if desired, the index and balance sheets may be arranged to coöperate with all of the account sheets of a book, whenever this may be found advisable.

It will be understood that the divisions of the book herein illustrated are alike, each including an index sheet 4, a desired or required number of ledger or account sheets 5, arranged between said index sheet and the associated division leaf 3, and a balance card or sheet 6. In the construction of book disclosed, the division leaves 3 are of greater width than the index and account sheets 4 and 5, and have their ends extended at the right hand margin, as shown at 7, to which extensions of the division leaves the respective balance cards or sheets 6 are applied.

The index sheet 4 is provided with one or more vertical columns 8, which are ruled to provide the horizontal lines or spaces, which spaces are designed to receive, in successive order, the names of the depositors or customers within range of the alphabetical group represented by such section of the book. This column or columns has a head space in which is written or printed the word "Name," or any other appropriate designation, and at the right hand marginal edge of the sheet is a column 9, appropriately headed "No.," within which are arranged in regular order the numbers of the ledger or account sheets on which the accounts of the depositors or customers named are kept, such numbers being arranged in the transverse rows or spaces opposite the names, as clearly shown in Fig. 1.

Each ledger or account sheet 5 is provided with a head space 10 having suitable ruled printed lines or spaces 11 and 12 to receive the name and address of the depositor or customer whose account is kept thereon, said lines or spaces being appropriately designated as shown. The head space 10 also has a line or space 13 to receive the number of the sheet, and which is also appropriately designated. The body of the sheet is sub-divided by vertical horizontal ruled lines to provide vertical columns 14, 15, 16, 17, 18 and 19, the transverse spaces of which register with the transverse spaces of the column 8 of the name or index sheet 4.

The column 14 of the sheet 5 may be employed for information entries, remarks, etc., while the column 15, which is appropriately headed "Date," receives the entries of the dates on which the itemized deposits and withdrawals are noted. The column 16 is headed "Checks in detail" and receives all items pertaining to withdrawals, the totals of which are placed in the column headed "Total checks." The column 18 is designed to receive the items of deposits and is so headed, while the column 19 is designed to receive statements of the balances from day to day, and is appropriately headed "Balance."

Secured to the right hand margins of the ledger or account sheets are index tabs 20, which project laterally beyond the margins of said sheets and between the same and the balance card or sheet 6, so as to be conspicuously displayed for coöperation with the index sheet, ledger or account sheets and the balance card or sheet. The projecting portions of these tabs are numbered in regular order in accordance with the numbers of the ledger sheets, and the index numbers upon the index sheet, which may either designate the numbers of the accounts, or simply numbers of the account sheets devoted to the depositors or customers whose accounts are included in the section of the book. It will be observed that by the arrangement described the numbered ends of the tabs are disposed in transverse alinement with the corresponding numbers in the column 9 of the index sheet 4, so that upon referring to any given name in the column 8 and the following number of the page in the column 9, the tab indicating the position and attached to the ledger sheet on which the particular account is kept will be disposed for conspicuous observation, so that the bookkeeper may incidentally turn to the particular ledger sheet desired, thereby saving time and labor in making the necessary entries.

The balance card or sheet 6 preferably consists of an oblong rectangular sheet of cardboard, which is printed on each side with columns to receive items in the transaction of a single day's business, allowing the card or sheet to be reversed and used to cover two days' work. This card or sheet is detachably inserted within a holder applied to the extension 7 of the division leaf 3, said holder consisting preferably of a sheet metal plate 21 having inturned bottom and side flanges 22 and 23, forming guideways and retaining strips to receive and retain the card, the upper end of the holder being flangeless or left open for the insertion and removal of the card. After one face of the card has been employed for a single day's entries, the card may be removed and reversed and reinserted so as to expose the other side for use, thus securing economy in the cost of material.

Each face of the card has a head space 23, provided with an appropriately designated date line or space 25. The body of the card is ruled to provide vertical columns 26, 27 28 and 29, and transverse lines or divisions extending across the same, and which correspond in arrangement to the transverse lines or divisions of the index and account sheets. The column 26 is headed "No." and has arranged therein in the same order as the column 9 the numbers of the account sheets or leaves contained in the associated section of the book. The column 27 has appropriately designated and is designed to receive check marks, indicating that the accounts designated by the checked spaces have been checked during the day, and that the changes have been appropriately indicated upon the balance card or sheet. The columns 28 and 29 are respectively headed "Old balances" and "New balances," and are designed to receive the entries of the previous balances from the day before and the new balances of those accounts which have changed. Between the head space 24 and the respective columns are also provided spaces 30 and 31 designated "Old balance" and "Old overdrafts," to receive entries of the aggregate amount of the old balances of the accounts and the previous overdrafts. At the foot of the columns are other spaces 32 and 33, appropriately designated with the "New balance" and "New overdrafts," to receive the differences at the end of the day's business between the old and new balances and the old and new overdrafts.

It will be evident from the foregoing description that when a deposit or withdrawal is made in connection with any particular account, reference to the index sheet 4 will indicate the account sheet upon which the particular customer's account is kept, and that the tab in line with the name and number in the column 9 of the account will incidentally and visually indicate the location of the account sheet, enabling the bookkeeper to turn to the sheet and make his entries with facility. Having done this it is simply necessary for him to follow the transverse line of the indicating tab attached to said sheet out to the proper transverse space and of the balance card or sheet, so that changes in the items of the particular account in question may be readily and conveniently noted in the columns 28 and 29 and checked off in the column 27, whereby, when any change in an account, in either debit or credit direction, takes place, a record may be immediately made so that the standing of the account at all times may incidentally be ascertained.

In the use of the invention, it will be understood that in carrying forward the standings from day to day, it is simply necessary to place the aggregate amount of the old balances in the space 30 and old overdrafts in the space 31, and to enter in the columns 28 and 29 only such items as pertain to the standing of this account and effected during the particular day's business, and at the conclusion of business on that day to add up the totals of the old and new balances so that the resulting amounts of the new balances and new overdrafts may be placed in the foot columns 32 and 33, which items are carried forward as old balances and old overdrafts in the appropriate columns of the balance card or sheet used in keeping account of the following day's business. Hence by referring to the index sheet and balance card or sheet, the standing of any particular account within the range of the index sheet may be immediately determined at any time, while the described arrangement of the tabs and designating account sheet numbers in the columns 9 and 26 obviously facilitate reference to the essential elements of the account system, as an arrangement of mutual indexing is thereby provided. The construction and arrangement is also such that the bookkeeper handles only the balances of the active accounts which are effected during each day's business, and which only have to be brought forward in detail and to be run off on the adding machine, by which a great saving in time and labor as well as other obvious advantages are obtained over prior systems employing balancing tabs or no visible balancing feature at all.

Other advantages of my improved construction and arrangement of index, account and balance sheet will be obvious to those versed in the art without further description.

I claim:—

1. An account book including a plurality of account sheets, provided with account columns and transverse spaces intersecting the same, tabs secured to the marginal edges of the sheets in line with different transverse spaces thereof, said tabs being consecutively numbered, an index sheet overlying the account sheets and provided with a column for names having transverse spaces coinciding in arrangement and in alinement with the transverse spaces of the sheets and numbered to correspond to and arranged to register with the tabs, and an account slip arranged beyond the tabbed margins of the account sheets and having columns for old and new balances, said columns being divided into similar transverse spaces and numbered to accord with the tabs and numbers of the transverse spaces of the index sheet.

2. An account book including a series of account sheets having appropriately designated columns with transverse spaces for entries of withdrawals, deposits and balances, tabs secured to the free lateral margins of the sheets in alinement with different transverse spaces of the sheets, said tabs having their projecting portions numbered in consecutive order, an index sheet overlying the first account sheet and provided with an appropriately designated column for names with transverse spaces corresponding in arrangement and number to the tabs, and a balance card or sheet arranged beyond the lateral margins of the account and index sheets, said balance card or sheet having appropriately designated spaces for old and new balances and transverse spaces numbered in accordance with the numbers upon the tabs and index sheets and arranged opposite the same.

3. An account book including a series of account sheets having appropriately designated columns with transverse spaces for entries of withdrawals, deposits and balances, tabs secured to the free lateral margins of the sheets in alinement with different transverse spaces of the sheets, said tabs having their projecting portions numbered in consecutive order, an index sheet overlying the first account sheet and provided with an appropriately designated column for names with transverse spaces corresponding in arrangement and numbering to the tabs, a division leaf arranged to follow the account leaves and provided with an extension beyond the tabbed edges of said leaves, a holder upon said extension, and a balance card adapted to be slidably engaged with and disengaged from said holder, said card being provided with appropriately designated columns for balance entries, said columns being divided into transverse spaces arranged to register with the tabs and transverse spaces of the index sheet and correspondingly numbered.

In testimony whereof I affix my signature in presence of two witnesses.

JAMES T. WILLIS.

Witnesses:
WILMER W. SHEPHERD,
W. T. BUNYG.